United States Patent
Nakayama et al.

(10) Patent No.: US 10,950,915 B2
(45) Date of Patent: Mar. 16, 2021

(54) CONNECTION MODULE INCLUDING BUS BAR EXTENDING OVER GROOVE ACCOMODATING CONNECTION MODULE-SIDE WIRES

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Osamu Nakayama, Mie (JP); Mitsutoshi Morita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 95 days.

(21) Appl. No.: 16/328,157

(22) PCT Filed: Aug. 23, 2017

(86) PCT No.: PCT/JP2017/030036
§ 371 (c)(1),
(2) Date: Feb. 25, 2019

(87) PCT Pub. No.: WO2018/043230
PCT Pub. Date: Mar. 8, 2018

(65) Prior Publication Data
US 2019/0198849 A1 Jun. 27, 2019

(30) Foreign Application Priority Data
Sep. 5, 2016 (JP) .............................. JP2016-172637

(51) Int. Cl.
*H01M 50/502* (2021.01)
*H01M 50/20* (2021.01)
*H01M 50/543* (2021.01)

(52) U.S. Cl.
CPC ......... *H01M 50/502* (2021.01); *H01M 50/20* (2021.01); *H01M 50/543* (2021.01)

(58) Field of Classification Search
CPC ....... H01M 2/206; H01M 2/1077; H01M 2/30
(Continued)

(56) References Cited

U.S. PATENT DOCUMENTS

2011/0064987 A1* 3/2011 Ogasawara ........... H01M 2/206
429/121
2013/0260611 A1 10/2013 Ahn
(Continued)

FOREIGN PATENT DOCUMENTS

JP 2013-214498 10/2013
JP 2014-022157 2/2014
(Continued)

OTHER PUBLICATIONS

Official Communication issued in International Bureau of WIPO Patent Application No. PCT/JP2017/030036, dated Sep. 19, 2017.

*Primary Examiner* — Sean P Cullen
(74) *Attorney, Agent, or Firm* — Greenblum & Bernstein, P.L.C.

(57) ABSTRACT

Provided is a connection module for electrically connecting a plurality of power storage modules having a plurality of power storage elements, the connection module including: connection module-side wires; a bus bar that electrically connects the adjacent power storage modules; and an insulation protector having: an arrangement groove which extends along a first direction and in which the connection module-side wires are arranged; and a bus bar holding part
(Continued)

that holds the bus bar. The bus bar has: a main body part that extends in the first direction; and extension parts that extend from the main body part in a second direction that intersects with the first direction, and the extension parts are disposed to extend over and across the arrangement groove.

11 Claims, 7 Drawing Sheets

(58) Field of Classification Search
USPC .......................................................... 429/158
See application file for complete search history.

(56) References Cited

U.S. PATENT DOCUMENTS

| | | | |
|---|---|---|---|
| 2014/0057152 A1* | 2/2014 | Furuya | H01M 2/1077 429/121 |
| 2014/0139185 A1 | 5/2014 | Han et al. | |
| 2014/0205889 A1 | 7/2014 | Kim et al. | |

FOREIGN PATENT DOCUMENTS

| | | | | |
|---|---|---|---|---|
| JP | 2014-138000 | | 7/2014 | |
| JP | 2017-076542 | | 4/2017 | |
| WO | WO-2017130705 A1 * | 8/2017 | ............. | H01M 2/30 |

\* cited by examiner

CONNECTION MODULE INCLUDING BUS BAR EXTENDING OVER GROOVE ACCOMODATING CONNECTION MODULE-SIDE WIRES

TECHNICAL FIELD

The technique disclosed in the present description is related to a connection module for mutually connecting a plurality of power storage modules.

BACKGROUND ART

Electric connection of a power storage module for an electric vehicle or a hybrid vehicle is established by a wiring module being attached to a power storage element group in which a plurality of flat-shaped power storage elements are arrayed. The wiring module collectively holds bus bars for connecting the electrodes of the power storage elements and detection wires for voltage detection.

Furthermore, a plurality of such power storage modules are electrically connected by external connection terminals provided in the power storage modules being mutually connected by bus bars. Also in mutually connecting such power storage modules, connection modules collectively holding bus bars and a plurality of detection wires drawn out from power storage modules may be used.

CITATION LIST

Patent Documents

Patent Document 1: JP 2014-22157A

SUMMARY OF INVENTION

Technical Problem

On the other hand, in power storage modules to be mounted in a vehicle, bus bars for connecting adjacent power storage modules may be bent in order to prevent interference with other components, so that components can be arranged efficiently within a small space. However, there is a problem that, in such a case, a wire arrangement groove needs to be provided in a connection module so that the wire arrangement groove does not interfere with the bent bus bar, and the size of the connection module increases.

The technique disclosed in the present disclosure has been made based on the above-described situation, and an aim thereof is to reduce connection module size.

Solution to Problem

The technique disclosed in the present description is a connection module for electrically connecting a plurality of power storage modules having a plurality of power storage elements, the connection module including: connection module-side wires; a bus bar for electrically connecting the adjacent power storage modules; and an insulation protector having: an arrangement groove which extends along a first direction and in which the connection module-side wires are arranged; and a bus bar holding part that holds the bus bar, wherein the bus bar has: a main body part that extends in the first direction; and extension parts that extend from the main body part in a second direction that intersects with the first direction, and the extension parts are disposed to extend over and across the arrangement groove.

According to such a configuration, the extension parts of the bus bar are disposed three-dimensionally with respect to the arrangement groove. Accordingly, effective use can be made of areas of the insulation protector that have not been conventionally used as wire arrangement areas. Accordingly, spatial efficiency within the connection module can be improved and the overall size of the connection module can be reduced.

The above-described connection module may have the following configurations.

Insulative groove covers positioned between the arrangement groove and the extension parts may be provided on at least areas of the arrangement groove that the extension parts extend over and across.

According to such a configuration, the formation of a short-circuit between the extension parts of the bus bar and the connection module-side wires arranged inside the arrangement groove can be prevented.

An insulative bus bar cover that covers an area of the bus bar excluding at least connection parts to be connected to the power storage modules may be provided.

According to such a configuration, the bus bar, in which a relatively large current flows, can be reliably insulated. Hence, a situation in which a worker directly contacts the bus bar can be prevented, whereby the connection module is provided with improved safety.

Connector parts may be connected to ends on one side of the connection module-side wires, and power storage module-side wires drawn out from the power storage modules may be connected to the connector parts.

According to such a configuration, with the connection module-side wires arranged in advance in the arrangement groove with respect to the insulation protector, the connection module in which the connection module-side wires have been arranged can be attached to the power storage modules, and following this, the power storage module-side wires and the connection module-side wires can be connected via the connector parts. Accordingly, the workability of the operation of attaching the connection module to the power storage modules can be improved.

The insulation protector may include connector fixing parts for fixing the connector parts.

According to such a configuration, the connector parts can be fixed to the insulation protector. Accordingly, it is possible to have the insulation protector stably hold the connection module-side wires or the power storage module-side wires.

The extension parts may include: extension base end parts that extend in the second direction; step parts that extend in a step shape from the extension base end parts toward the power storage modules; and connection parts that extend in the second direction from the step parts and that are to be connected to the power storage modules, and the extension base end parts may be disposed to extend over and across the arrangement groove.

According to such a configuration, effective use can be made of the spaces between the extension parts (the extension base end parts) and the insulation protector, which have not been conventionally used as spaces for arranging the connection module-side wires.

Advantageous Effects of Invention

According to the technique disclosed in the present description, the overall size of the connection module can be reduced.

DESCRIPTION OF EMBODIMENTS

Figure 1:
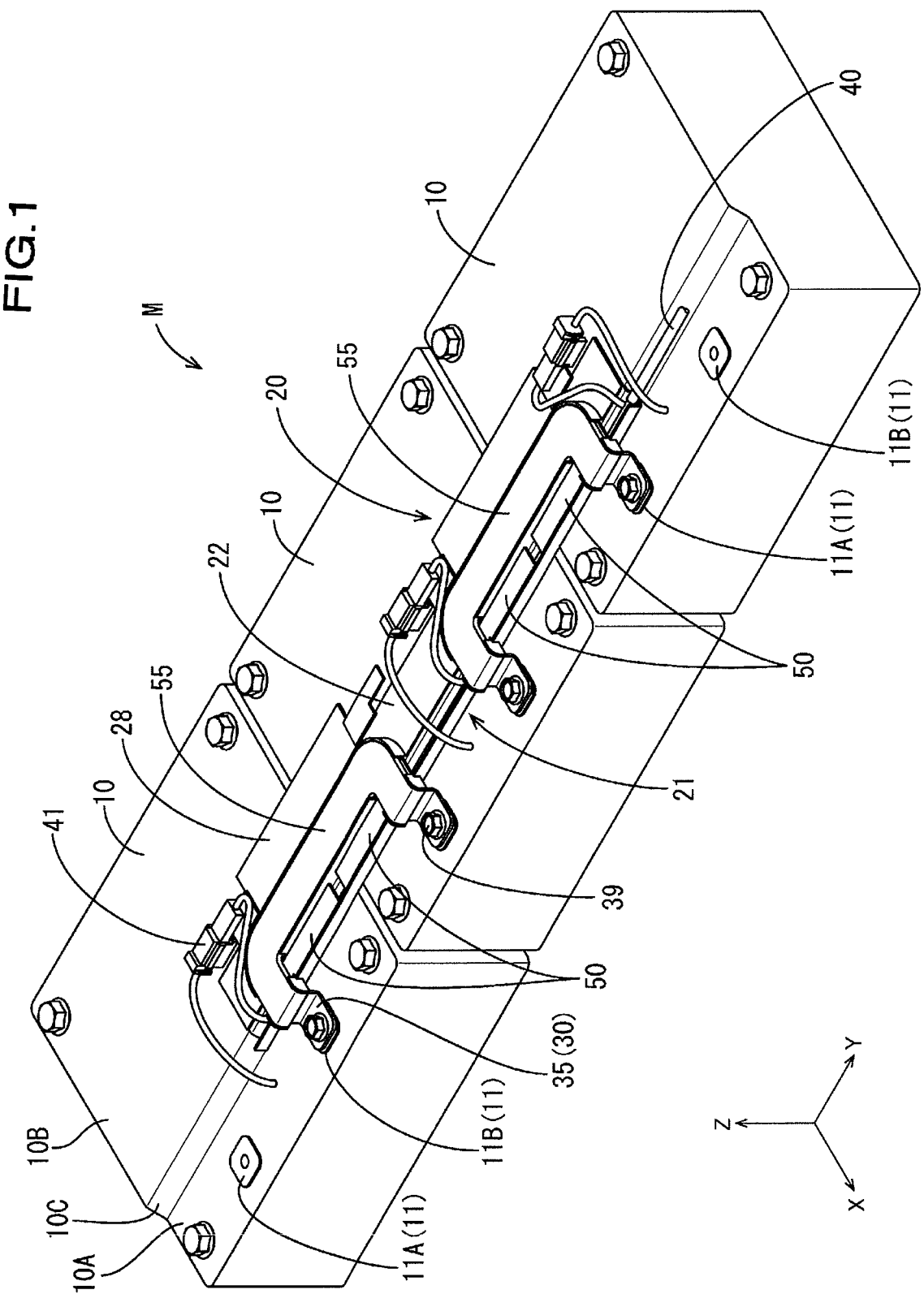
FIG. 1 is a perspective view of a battery pack module of one embodiment.
Figure 2:
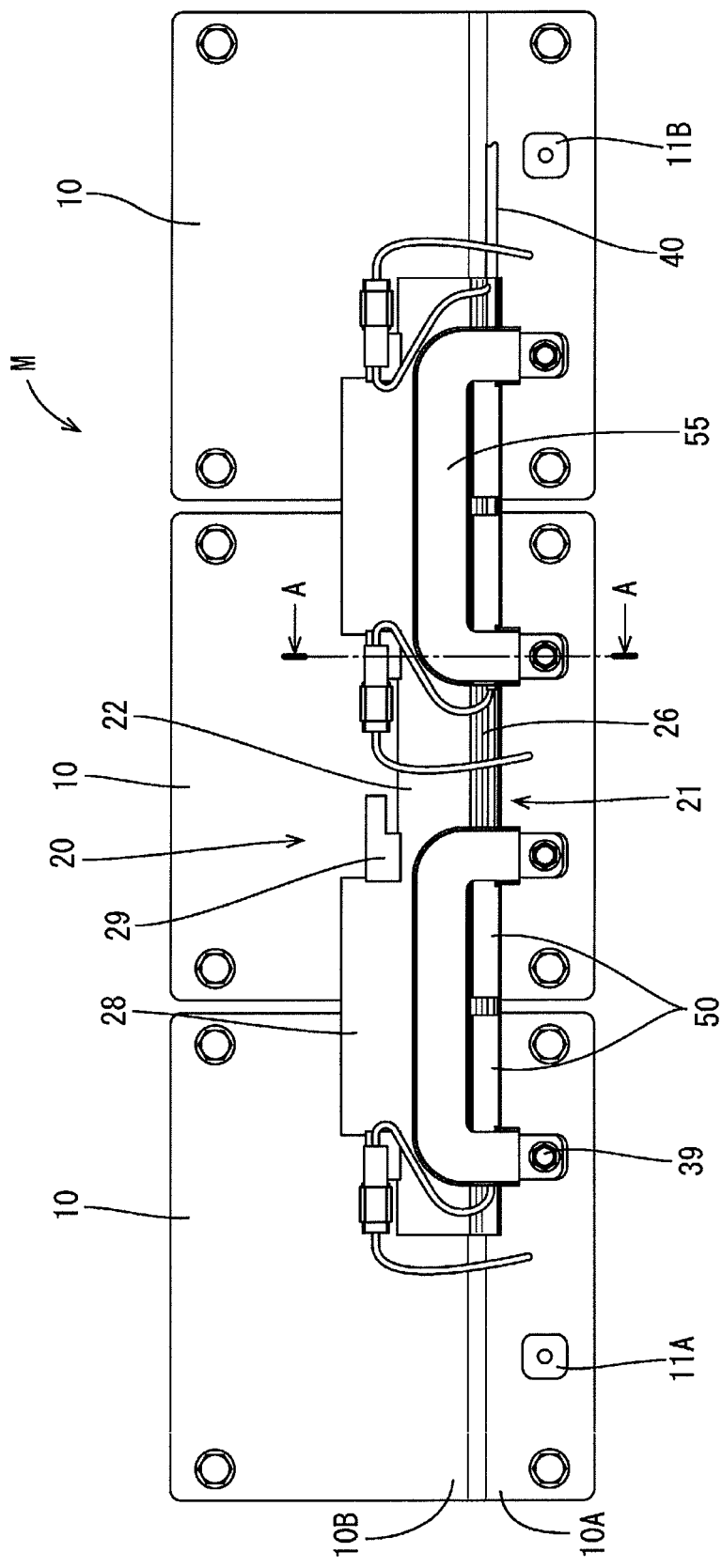
FIG. 2 is a plan view of the battery pack module.

One embodiment is described with reference to FIGS. 1 to 7. As illustrated in FIG. 1, a connection module 20 of the present embodiment is for connecting a plurality of battery packs 10 (one example of power storage modules). The plurality of battery packs 10 (referred to hereinafter as a battery pack module M) connected by this connection module 20 are used, for example, as a driving source of an electric vehicle, a hybrid vehicle, or the like. The plurality of battery packs 10 are connected in series by the connection module 20.

In the following description, the X direction in FIG. 1 is regarded as the front, and the direction opposite to the X direction is regarded as the rear. Furthermore, the Y direction in FIG. 1 is regarded as the right, and the direction opposite to the Y direction is regarded as the left. Furthermore, the Z direction in FIG. 1 is regarded as upward, and the direction opposite to the Z direction is regarded as downward.

The battery pack module M is configured to include the plurality of battery packs 10 (three in the present embodiment) and the connection module 20. The connection module 20 includes wires 40 to be connected to an undepicted electronic control unit, and a plurality of bus bars 30 connecting the adjacent battery packs 10.

Battery Packs 10

The battery packs 10 each house a unit cell group in which a plurality of undepicted unit cells (one example of power storage elements) are arrayed and electrically connected inside a case, and have a substantially cuboid overall shape.

Figure 3:
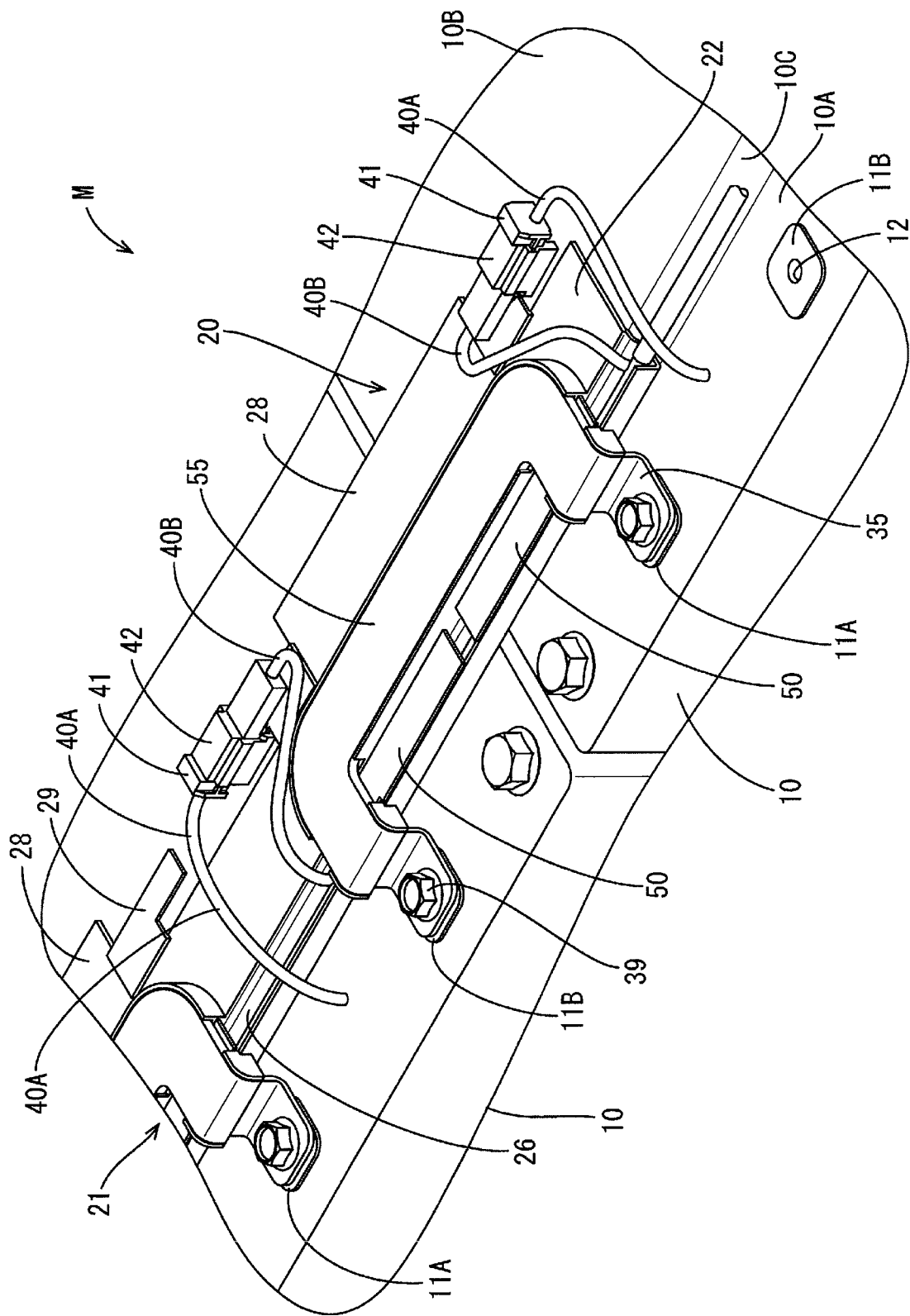
FIG. 3 is a perspective view illustrating a part of the battery pack module in an enlarged state.

In the upper surfaces of these battery packs 10, areas covering approximately one third at the front are formed to be one step lower from the areas at the rear to form a step shape, as illustrated in FIGS. 1 and 3. In the following, this low area at the front is referred to as a first area 10A, the high area at the rear is referred to as a second area 10B, and the step part between the first area 10A and the second area 10B is referred to as a step part 10C.

Near the left and right ends of the first area 10A, a pair of external connection terminals 11 consisting of a positive electrode 11A and a negative electrode 11B that are electrically connected to the undepicted unit cell group inside the case is provided. These external connection terminals 11 each have a flat rectangular shape and have a bolt hole 12 formed at the center thereof. The bolt hole 12 is provided to perform bolting when a later-described bus bar 30 is placed thereon.

In the present embodiment, three battery packs 10 are arrayed in one line along the left-right direction so that the external connection terminals 11 of adjacent battery packs 10 have different polarities (so that the positive electrodes 11A and the negative electrodes 11B are disposed alternatingly).

Furthermore, a bundle of wires 40 (battery pack-side wires 40A) for detecting unit cell voltage are drawn out from each battery pack 10, and a battery pack-side connector 41 for connection is provided at the leading end of the bundle of wires 40.

Connection Module 20

Figure 5:
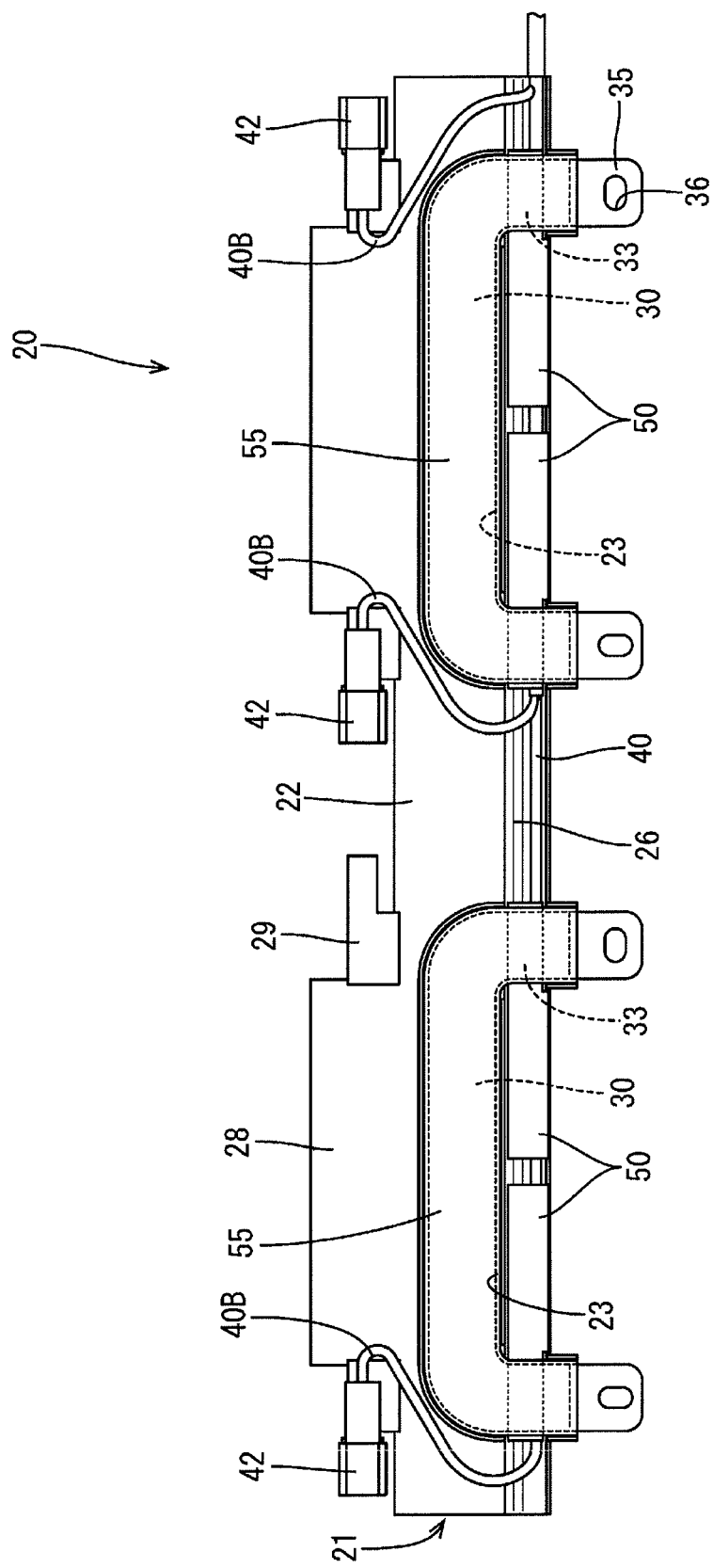
FIG. 5 is a plan view of a connection module.

The connection module 20 is to be attached to the upper surfaces (the surfaces on which the external connection terminals 11 are provided) of the battery packs 10. As illustrated in FIG. 5, the connection module 20 includes: a plurality of bus bars 30 (two in the present embodiment) to be connected to external connection terminals 11 of the battery packs 10; connection module-side wires 40B whose ends on one side are to be connected to the battery pack-side wires 40A drawn out from the battery packs 10 and whose ends on the other side are to be connected to an undepicted electronic control unit; and an insulation protector 21 having bus bar holding parts 23 for holding the bus bars 30 and an arrangement groove 26 in which the connection module-side wires 40B are to be arranged.

Bus Bar 30

Figure 7:
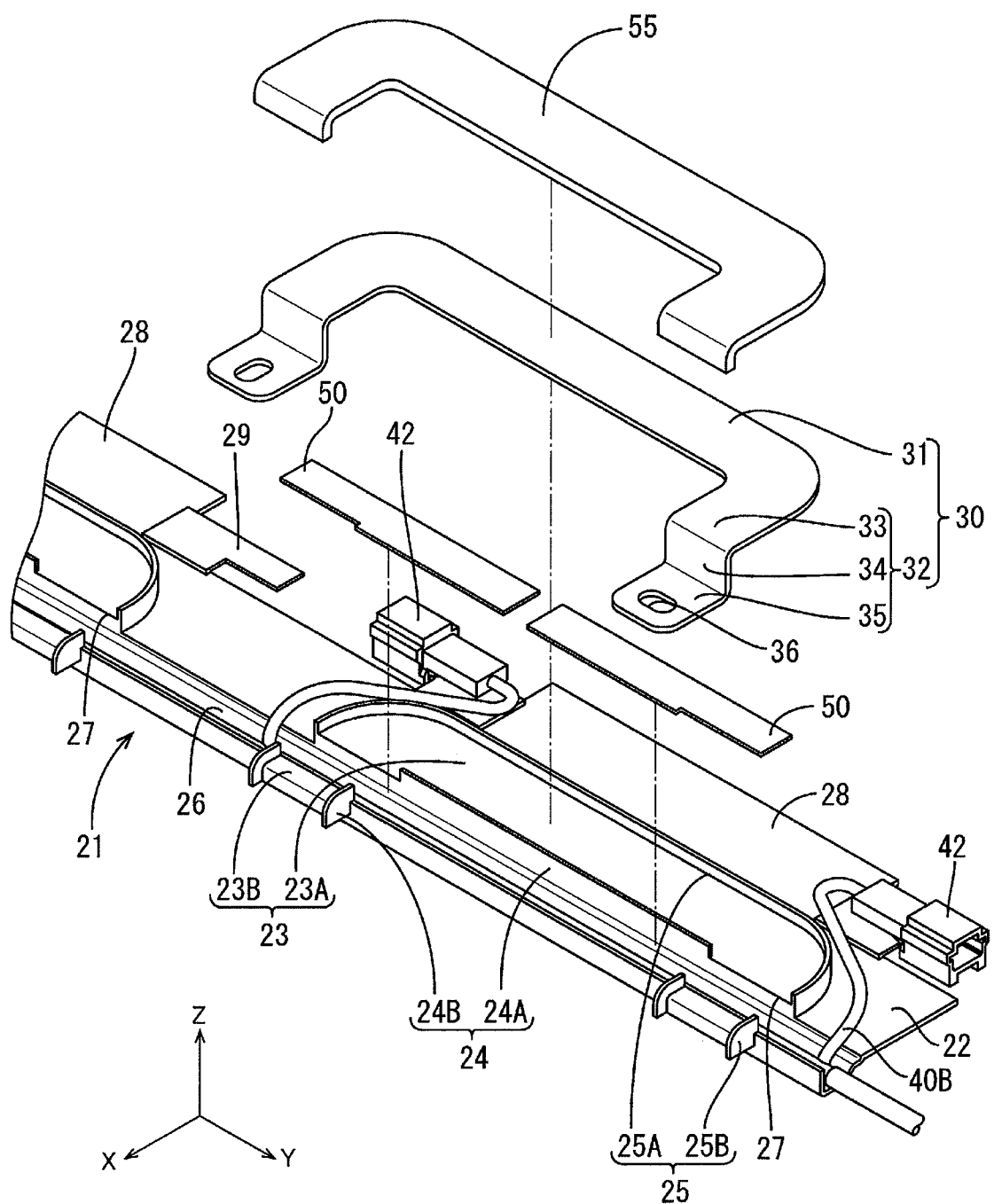
FIG. 7 is a perspective view illustrating a part of the connection module in an enlarged state.

Each bus bar 30 is formed by pressing a metal plate material (i.e., unitary metal plate) made from copper, a copper alloy, stainless steel (SUS), aluminum, or the like into a predetermined shape, and has a substantially U-shaped overall shape in plan view. In more detail, as illustrated in FIG. 7, the bus bar 30 includes: a coupling part 31 (one example of a main body part) that extends along the left-right direction (a first direction); and a pair of extension parts 32 that extend toward the front (a second direction) from both ends of the coupling part 31 and are bent in a crank shape.

To provide a more detailed description, the extension parts 32 include: extension base end parts 33 that extend toward the front (the second direction) from both end parts of the coupling part 31 along the plate surface of the coupling part 31; step parts 34 that are bent downward (toward the battery packs 10) from the leading ends of the extension base end parts 33; and connection parts 35 that extend toward the front (the second direction) from the bottom ends of these step parts 34.

In the pair of connection parts 35, elongated connection holes 36 to be connected by bolting with external connection terminals 11 of the battery packs 10 described above are formed to penetrate the plate surfaces of the connection parts 35. This pair of connection holes 36 is provided so that the connection hole 36 at one side (at the left) is elongated in the front-rear direction and the connection hole 36 at the other side (at the right) is elongated in the left-right direction. The bus bar 30 and external connection terminals 11 (battery packs 10) are electrically connected due to connection bolts 39 inserted to penetrate these connection holes 36 being screwed into the bolt holes 12 of the battery packs 10 (refer to FIGS. 1 to 4).

Note that the surfaces of the bus bars 30 may be plated with a metal such as tin, nickel, or the like.

Wires 40

The wires 40 detect the voltages of the unit cells inside the battery packs 10 and send the voltages to the electronic control unit (undepicted). The wires 40 are constituted by: the battery-pack side wires 40A and the connection module-side wires 40B. A plurality of the battery pack-side wires 40A are bundled up and drawn out from each battery pack 10. The connection module-side wires 40B are connected to the battery pack-side wires 40A via connector parts (the battery pack-side connectors 41 and connection module-side connectors 42) and are arranged inside the arrangement groove 26 of the later-described insulation protector 21.

Insulation Protector 21

Figure 6:
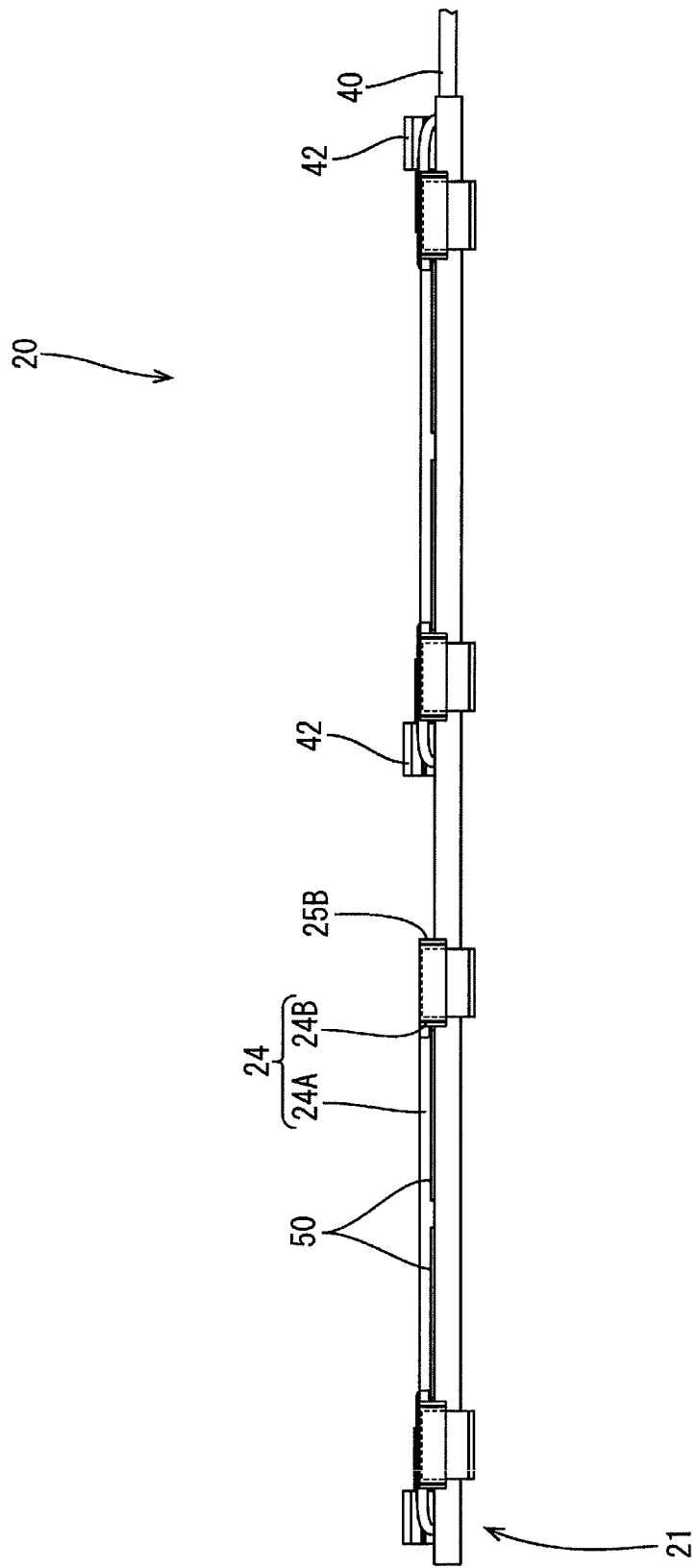
FIG. 6 is a front view of the connection module.

The insulation protector 21 is made from a synthetic resin and has an insulation main body part 22 having the shape of a thin plate elongated in the direction in which the battery packs 10 form a line (the left-right direction), as illustrated in FIGS. 5 to 7. The front side edge part of the insulation main body part 22 is curved downward in a U-shape and is configured as the arrangement groove 26, in which the plurality of wires 40 are arranged. In other words, the arrangement groove 26 is provided in a state such that the arrangement groove 26 extends in the shape of one straight line along the front side edge part of the insulation main body part 22 along the left-right direction (the first direction) and is opened upward.

The insulation main body part 22 is provided with the bus bar holding parts 23 for holding the above-described bus bars 30. The bus bar holding parts 23 are each formed by a pair of standing walls (24, 25) which stand up from the insulation main body part 22 and at the inside of which a bus bar 30 is to be fitted.

In more detail, as illustrated in FIG. 7, each bus bar holding part 23 is formed by: an inner peripheral wall 24 that is erected to extend along the inner side edge part of the bus bar 30 provided with a substantially U-shape in plan view; and an outer peripheral wall 25 that is erected to extend along the outer side edge part of the bus bar 30. This bus bar holding part 23 is formed so that the pair of connection parts 35 of the bus bar 30 is guided out to the front of the insulation main body part 22. That is, as illustrated in FIG. 3, in a state in which a bus bar 30 is held in the bus bar holding part 23, the coupling part 31 and the pair of extension base end parts 33 of the bus bar 30 are accommodated inside the bus bar holding part 23, and the step parts 34 and the connection parts 35 of the bus bar 30 are disposed at the front of the insulation protector 21 (the arrangement groove 26).

Figure 4:
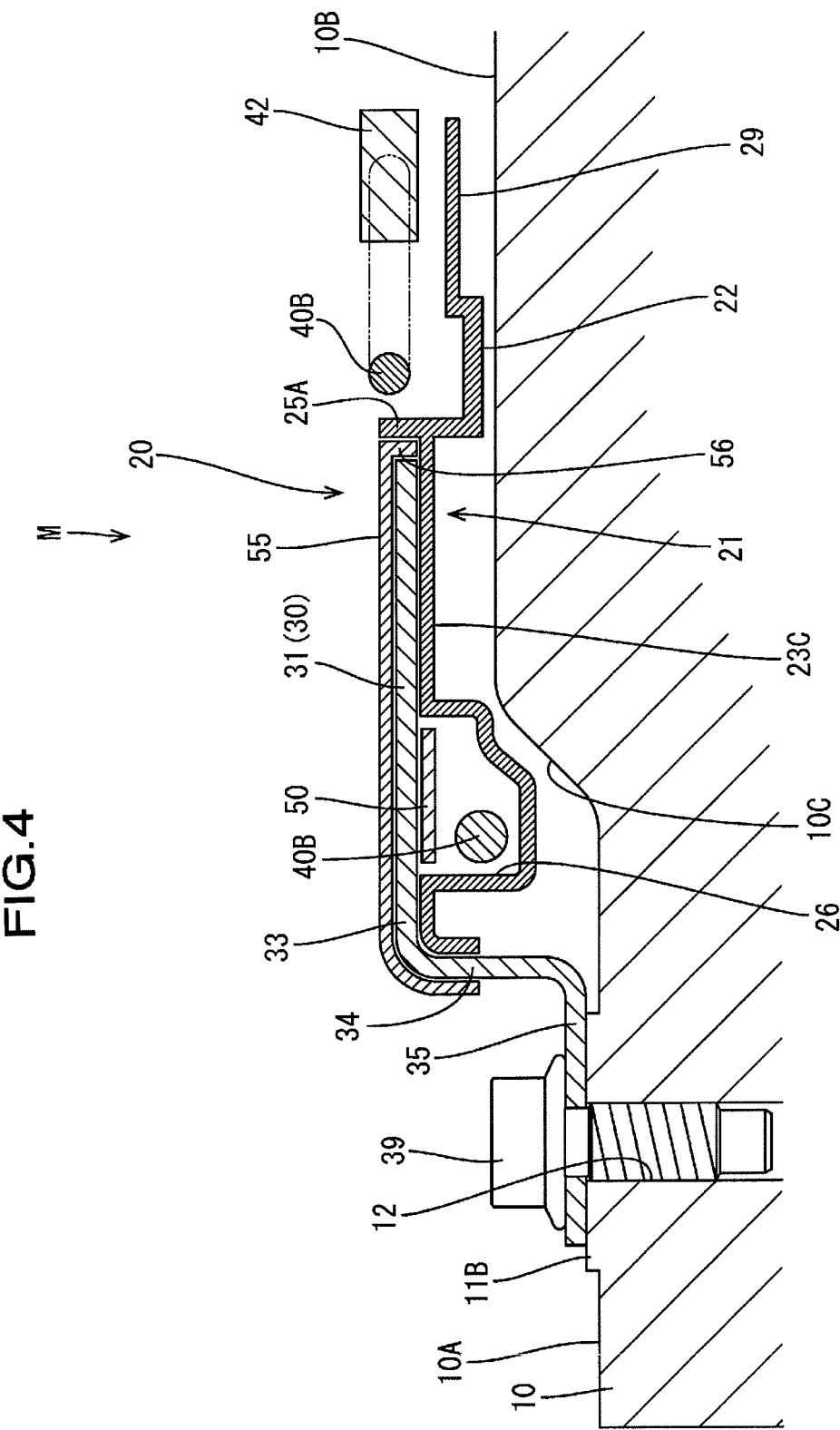
FIG. 4 is a diagram illustrating a cross-section taken along line A-A in FIG. 2.

Note that the bus bar holding part 23 has a bottom part 23C that is set to a slightly higher position than the upper surface of the insulation main body part 22 (refer to FIG. 4).

This bus bar holding part 23 and the above-described arrangement groove 26 are provided so as to partially intersect in the top-bottom direction. To provide description with reference to FIG. 7, a portion 24A of the inner peripheral wall 24 of the bus bar holding part 23 that is disposed along the coupling part 31 of the bus bar 30 stands up and is continuous with the rear groove wall of the arrangement groove 26, and a portion 25A of the outer peripheral wall 25 of the bus bar holding part 23 that is similarly disposed to extend along the coupling part 31 of the bus bar 30 is provided at the rear side of the portion 24A across a predetermined distance. That is, the coupling part 31 of the bus bar 30 is held along the arrangement groove 26 (along the first direction) behind the arrangement groove 26. In the following description, the area of the bus bar holding part 23 that holds the coupling part 31 is referred to as a coupling part holding part 23A.

On the other hand, portions (referred to hereinafter as extension base end part holding parts 23B) of the bus bar holding part 23 that hold the pair of extension base end parts 33 of the bus bar 30 are disposed to intersect with the above-described arrangement groove 26, or in other words, are disposed to extend in the front-rear direction (the second direction) above the arrangement groove 26 and to extend over and across the arrangement groove 26. Furthermore, the front ends thereof are formed to protrude further toward the front than the arrangement groove 26 (refer to FIG. 5).

Furthermore, the portion of each extension base end part holding part 23B that extends over and across the arrangement groove 26 (a part of the bottom part 23C and groove wall portions 24B, 25B that are disposed to extend along the extension base end part 33) is cut out so that the connection module-side wires 40B can be accommodated inside the arrangement groove 26 (the portion that is cut out is referred to as a cut-out part 27). In other words, the arrangement groove 26 is opened upward due to the extension base end part holding parts 23B being partially cut out.

At portions of the insulation main body part 22 behind the bus bar holding part 23, a rectangular plate-shaped projection part 28 that has a slightly smaller width in the left-right direction than the bus bar holding part 23 is disposed to extend toward the rear. Furthermore, at the left and right side edge parts of this projection part 28, a pair of fixing pieces 29 (one example of connector fixing parts) that extend upward and outward (in the left-right direction) in a step shape are provided. These fixing pieces 29 are for fixing the connection module-side connectors 42 connected to the terminals of the above-described connection module-side wires 40B.

Parts of the arrangement groove 26 in the insulation protector 21 are closed by groove covers 50. Each groove cover 50 is for reliably providing insulation between the portion (the extension base end part 33) of a bus bar 30 that is disposed to intersect with the arrangement groove 26 and the connection module-side wires 40B disposed therebelow. Accordingly, the size of the groove cover 50 is set to a size according to which it is possible to cover at least an area of the arrangement groove 26 intersecting with the bus bar holding part 23 (the extension base end part holding part 23B). In the present embodiment, as illustrated in FIG. 5, the size of the groove covers 50 is set to a size such that the extension base end parts 33 of the bus bar 30 an area of the arrangement groove 26 that is adjacent to an inner side edge part of the bus bar 30, which is provided with a U-shape in plan view, are substantially closed by the groove covers 50.

Furthermore, each bus bar holding part 23 of the insulation protector 21 is entirely covered by a bus bar cover 55. The bus bar cover 55 has a plan view U-shape covering the coupling part 31 and the pair of the extension base end parts 33 of a bus bar 30 from above, and the leading ends of both end parts thereof are bent downward to partially cover the step parts 34 (refer to FIG. 3). The width dimension of this bus bar cover 55 is configured so that the bus bar cover 55 can fit into the bus bar holding part 23. Furthermore, an insulation rib 56 that extends downward is provided at an end edge part of the bus bar cover 55 that is disposed at the outer peripheral side of the coupling part 31 of the bus bar 30 (refer to FIG. 4), and in a state in which the bus bar holding part 23 has been covered with the bus bar cover 55, the outer-peripheral side edge part of the coupling part 31 of the bus bar 30 is securely insulated from the outside by the double structure formed by the insulation rib 56 and the outer peripheral wall 25.

The connection module 20 of the present embodiment has a structure as described above. Next, description will be provided for the assembly procedure.

First, the connection module-side wires 40B are arranged inside the arrangement groove 26 in the insulation protector 21, and the connection module-side connectors 42 are fixed to the adjacent fixing pieces 29. Then, the groove covers 50 are attached to predetermined positions on the arrangement groove 26. Hence, the connection module-side wires 40B are prevented from bulging out from within the arrangement groove 26 and are stably held in the insulation protector 21.

Next, the bus bars 30 are placed inside the bus bar holding parts 23 in the insulation protector 21. The bus bars 30 are accommodated in an orientation in which the pairs of extension parts 32 are guided out to the front of the insulation main body part 22. In a state in which the bus bars 30 are held inside the bus bar holding parts 23, the extension base end parts 33 of the bus bars 30 are disposed above the arrangement groove 26 to extend over and across the arrangement groove 26. Furthermore, at this point, the groove covers 50 are already provided between the extension base end parts 33 of the bus bars 30 and the connection module-side wires 40B inside the arrangement groove 26. Accordingly, the bus bars 30 and the connection module-side wires 40B are reliably insulated from one another.

Next, the bus bar covers 55 are attached to cover the bus bars 30 from above. Each bus bar cover 55 covers the coupling part 31, the extension base end parts 33, and parts of the step parts 34 of a bus bar 30, and is fitted into the space between the inner peripheral wall 24 and the outer peripheral wall 25 that form a pair. Furthermore, at this point, the insulation rib 56 of the bus bar cover 55 is fitted into the space between the outer-peripheral side edge part of the coupling part 31 of the bus bar 30 and the outer peripheral wall 25 (the portion 25A extending along the coupling part 31) (refer to FIG. 4).

In this manner, the assembly of the connection module 20 is completed (refer to FIGS. 5 and 6).

The connection module 20 of the present embodiment, characterized as described above, is attached onto a group of battery packs 10 that are arrayed in a single line in the lateral direction. The procedure therefor is as follows.

First, in the front-rear direction, the insulation main body part 22 is placed on the second areas 10B of the upper surfaces of the battery packs 10 while the rear-side groove wall of the arrangement groove 26 of the connection module 20 (the insulation protector 21) is placed along the step parts 10C of the battery packs 10. Furthermore, in the left-right direction, positioning is performed so that positions of the connection parts 35 (the connection holes 36) of the bus bars 30 coincide with the positions of external connection terminals 11 (bolt holes 12) of the battery packs 10. Then, when the positions of the connection holes 36 and the positions of the bolt holes 12 have coincided, connection bolts 39 are screwed in, whereby the battery packs 10 and the connection module 20 (the bus bars 30) are electrically connected.

Next, the battery pack-side connectors 41 connected to the leading ends of the battery pack-side wires 40A drawn out from each battery pack 10 are fitted onto the predetermined connection module-side connectors 42 fixed onto the insulation protector 21 (the fixing pieces 29). Hence, the plurality of battery packs 10 are electrically connected to one another and the assembly of a battery pack module M having wires 40 connected thereto is completed.

Next, the effects of the present embodiment are described.

According to the connection module 20 of the present embodiment, a bus bar 30 has a plan view U-shape having a coupling part 31 extending in the left-right direction (the first direction) and extension parts 32 extending toward the front (the second direction) from both end parts of the coupling part 31, and extension base end parts 33 of the extension parts 32 are disposed to extend over and across an arrangement groove 26. Accordingly, effective use can be made of the areas below the extension parts 32, which have not been conventionally used as wire arrangement areas. Consequently, spatial efficiency in the connection module 20 can be improved and the size of the connection module 20 can be reduced compared to conventional connection modules.

Furthermore, insulative groove covers 50 positioned between the arrangement groove 26 and the extension parts 32 (the extension base end parts 33) of the bus bar 30 are provided on areas of the arrangement groove 26 that the extension parts 32 (the extension base end parts 33) extend over and across. Accordingly, the formation of a short-circuit between connection module-side wires 40B arranged inside the arrangement groove 26 and the extension parts 32 of the bus bar 30 can be prevented by these groove covers 50.

Furthermore, an area of the bus bar 30 excluding the connection parts 35 is covered by an insulative bus bar cover 55. Accordingly, the bus bar 30, in which a relatively large current flows, can be reliably insulated. That is, a situation in which a worker directly contacts the bus bar 30 can be prevented, whereby the connection module is provided with improved safety.

Furthermore, the connection module-side wires 40B and battery pack-side wires 40A are connected via connection module-side connectors 42 and battery pack-side connectors 41. Accordingly, with the connection module-side wires 40B arranged in advance in the arrangement groove 26 with respect to the insulation protector 21, the connection module 20 in which the connection module-side wires 40B have been arranged can be attached to battery packs 10, and following this, the power storage module-side wires 40A and the connection module-side wire can be connected via the connector parts 41, 42. Accordingly, the workability of the operation of attaching the connection module 20 to the battery packs 10 can be improved.

Furthermore, the insulation protector 21 includes fixing pieces 29 for fixing the connection module-side connectors 42. Accordingly, it is possible to have the insulation protector 21 stably hold the connection module-side wires 40B and also the battery pack-side wires 40A, which are to be connected to the connection module-side wires 40B.

Furthermore, the extension parts 32 of the bus bar 30 are bent downward in a crank-shape, and the extension base end parts 33 are disposed to extend over and across the arrangement groove 26. Accordingly, effective use can be made of the spaces between the extension parts 32 (the extension base end parts 33) and the insulation protector 21, which have not been conventionally used as spaces for arranging the connection module-side wires 40B.

OTHER EMBODIMENTS

The technique disclosed in the present description is not limited to the embodiment described by means of the description provided above and the drawings, and for example embodiments such as those described in the following are included in the technical scope thereof.

(1) The shape of the bus bar 30 is not limited to that in the above-described embodiment and can be modified as appropriate. For example, the bus bar 30 may be provided with a plan view L-shape, and the extension parts may be provided with a flat shape.

(2) The groove covers 50 and the bus bar cover 55 are not limited to those in the above-described embodiment, and the sizes, shapes, etc., thereof can be modified as appropriate. Alternatively, the groove covers 50 and the bus bar cover 55 may be omitted.

(3) In the above-described embodiment, the battery pack-side wires 40A and the connection module-side wires 40B are connected via the connectors 41, 42. However, the connection therebetween may be established by using another method, without the provision of connectors therebetween.

(4) The fixing pieces 29 for fixing the connectors may be omitted.

LIST OF REFERENCE NUMERALS

10: Battery pack (power storage module)
20: Connection module
21: Insulation protector
22: Insulation main body part
23: Bus bar holding part
26: Arrangement groove
29: Fixing piece (connector fixing part)
30: Bus bar
31: Coupling part (main body part)
32: Extension part
33: Extension base end part
34: Step part
35: Connection part
40: Wire
40A: Battery pack-side wire (power storage module-side wire)
40B: Connection module-side wire
41: Battery pack-side connector
42: Connection module-side connector (connector part)
50: Groove cover
55: Bus bar cover
M: Battery pack module
X: Front (second direction)
Y: Right (first direction)
Z: Up

The invention claimed is:

1. A connection module for electrically connecting a plurality of power storage modules having a plurality of power storage elements, the connection module comprising:
   connection module-side wires;
   a bus bar for electrically connecting adjacent power storage modules; and
   an insulation protector including an arrangement groove which extends along a first direction and in which the connection module-side wires are arranged, the insulation protector further including a bus bar holding part that holds the bus bar,
   wherein the bus bar comprises a unitary plate that includes a main body part that extends in the first direction, and extension parts that extend from the main body part in a second direction that intersects with the first direction, and
   the extension parts are disposed to extend over and across the arrangement groove.

2. The connection module according to claim 1, wherein the unitary plate is a unitary metal plate.

3. The connection module according to claim 1 further comprising
   an insulative bus bar cover that covers a portion of the bus bar excluding at least connection parts to be connected to the power storage modules.

4. The connection module according to claim 1, wherein insulative groove covers positioned between the arrangement groove and the extension parts are provided on at least portions of the arrangement groove that the extension parts extend over and across.

5. The connection module according to claim 1, wherein each of the extension parts includes a hole in a vicinity of an end of the extension parts away from the main body part in the second direction, the bus bar being connected to an electrode of the power storage modules via the hole.

6. The connection module according to claim 1, wherein the extension parts include extension base end parts that extend in the second direction and are connected to the main body part, step parts that extend in a step shape from the extension base end parts toward the power storage modules, and connection parts that extend in the second direction from the step parts and that are configured to be connected to electrodes of the power storage modules,
   the extension base end parts are positioned closer to the main body part than the connection parts, and
   the extension base end parts are disposed to extend over and across the arrangement groove.

7. The connection module according to claim 1, wherein connector parts are connected to ends on one side of the connection module-side wires, and
   power storage module-side wires drawn out from the power storage modules are connected to the connector parts.

8. The connection module according to claim 7, wherein the insulation protector includes connector fixing parts for fixing the connector parts.

9. The connection module according to claim 1, wherein the bus bar has a substantially U-shape.

10. The connection module according to claim 9, further comprising
    an insulative bus bar cover that has a substantially U-shape and covers the main body part and a portion of the extension parts.

11. The connection module according to claim 10, wherein the insulative bus bar cover covers an entire surface of the main body part, the surface facing opposite the power storage modules.

* * * * *